Figure 1:
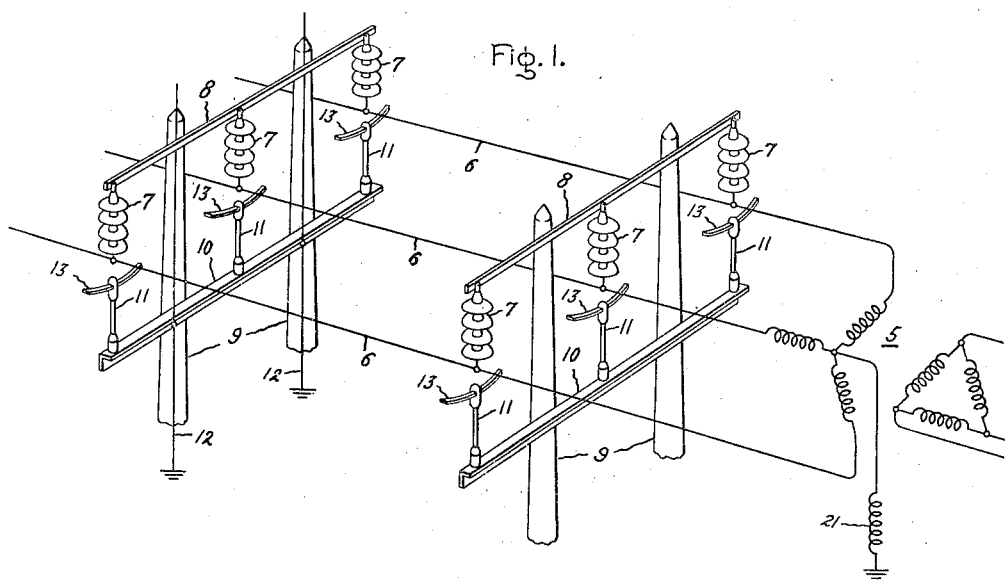

Dec. 26, 1939.   W. W. LEWIS   2,185,029
PROTECTION OF ALTERNATING CURRENT ELECTRIC SYSTEMS
Filed Feb. 24, 1937

Inventor:
Walter W. Lewis,
by Harry E. Dunham
His Attorney.

Patented Dec. 26, 1939

2,185,029

UNITED STATES PATENT OFFICE 2,185,029

PROTECTION OF ALTERNATING CURRENT ELECTRIC SYSTEMS

Walter W. Lewis, Schenectady, N. Y., assignor to General Electric Company, a corporation of New York Application February 24, 1937, Serial No. 127,428

6 Claims. (Cl. 175—30)

My invention relates to improvements in the protection of alternating-current electric systems and more particularly to systems which are operated without a grounded neutral, and an object of my invention is to provide new and improved means for more effectively and more economically protecting ungrounded neutral systems from the effects of transient overvoltages.

For relieving such overvoltages, there are known to the art expulsion gap discharge devices which are mounted on the system line supporting structures adjacent the line phase conductors. In general, these devices have two spaced electrodes so mounted in an expulsion tube that power-follow-current, after an arc-over within the tube, creates a high pressure within the tube. This expels the arc vapors from the tube, thereby quickly interrupting the short-circuit power-follow-current. In order to preclude leakage, corona, and tube carbonization, the gap device is usually mounted with the upper electrode spaced from the line conductor to provide a series gap. This avoids continuous application of system voltage to the tube. The lower electrodes of the devices at each supporting point are interconnected and for maximum benefits are grounded either directly or through another gap device. However, these expulsion gap devices have a maximum and a minimum current rating, outside of the range of which the tube may be damaged or destroyed. Current above the maximum rating is likely to destroy the device by disruption of the tube. If the current is below the minimum rating, insufficient pressure will be generated to extinguish the arc and the tube will be damaged by burning. Since ground short-circuit currents are often much less than phase short-circuit currents, gap devices of different ratings are frequently necessary. The ground short-circuit current gap device, which is of lower rating, is connected between the common connection of the phase short-circuit current gap devices and ground. If the ground short-circuit current gap device is omitted on a system without a grounded neutral, then a flashover to ground of a phase short-circuit current gap device is practically certain to result in severe damage to the device because the ground short-circuit current is merely that due to the capacitance or charging current to ground of the ungrounded phase conductors. This current is generally far below the minimum current rating of the phase short-circuit current gap device. The addition of a different rating fourth gap device for grounding the three phase short-circuit current gap devices in a three-phase alternating-current system increases the cost approximately one-third. This is a large amount, particularly in a line of any length, because it means an extra device at each line supporting point.

In order to reduce this expense to practical economical limits and yet be certain of the desired transient overvoltage protection, not only between phase conductors but also between phase conductors and ground, I combine, in accordance with my invention, expulsion gap devices for phase to phase disturbances and an arc suppressing reactance device for phase to ground disturbances. In this way, the necessity for a fourth ground disturbance gap device at each supporting point in a three-phase circuit is eliminated and the arc suppressing reactance device protects the phase short-circuit current gap devices in case of ground faults and at the same time suppresses or extinguishes the earth fault arc.

My invention will be better understood from the following description when considered in connection with the accompanying drawing, and its scope will be pointed out in the appended claims.

Figure 2:
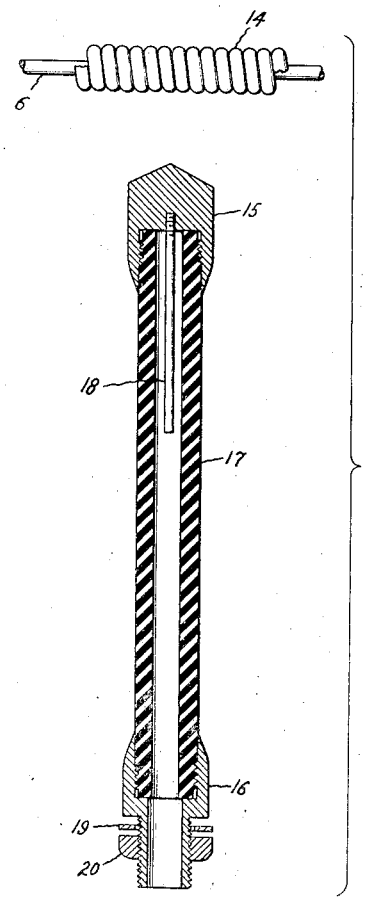

In the accompanying drawing, Fig. 1 illustrates, partly in diagram and partly in perspective, a portion of an alternating current electric system embodying my invention, and Fig. 2 illustrates a cross-sectional view of a gap expulsion device in position adjacent a line conductor.

Referring now to Fig. 1, I have illustrated a part of a three-phase electric system as comprising a delta-Y connected power transformer 5 and line phase conductors 6. As shown, these phase conductors are supported by suspension insulators 7 hung on cross arms 8 at different line supporting points, such as tower structures or poles 9.

For protection against transient overvoltages, there are provided means which can, on occurrence of such voltages, establish low impedance paths either between phase conductors or between any phase conductor and ground depending on where such transient overvoltages appear on the system. For this purpose, there are mounted on suitable means such as a cross arm 10 expulsion gap protective devices 11, whose upper electrodes are spaced from the line conductors and whose lower electrodes are conductively connected as by the cross arm 10 which may be metallic for this purpose. For more effective control, the lower electrodes may be grounded directly, by grounding the cross arm 10 as shown at 12. The series gap at the upper electrode prevents continuous application of system voltage to the gap devices and the possibilities of leakage, corona, and tube carbonization attendant thereon. In order to maintain the series gap setting in case of insulator swinging, the upper electrode may be provided with an arcing horn 13.

Expulsion gap devices suitable for the purpose are known to the art, but I have illustrated one form in Fig. 2 in cross-section and in its relation to the phase conductor 6 which is preferably provided with a guard or wrapper 14 to protect against arc scars and burns. The gap device 11 comprises upper and lower electrodes 15 and 16, respectively, which are secured to an expulsion tube 17 in any suitable manner. The upper electrode 15 has an extension 18 which projects into the tube 17. For fastening to the cross arm the lower electrode 16 may include suitable clamping means such as the lock washer 19 and a nut 20. The tube 17 may be composed of a suitable dielectric material which is capable of rapidly evolving gas in the presence of an arc discharge whereby to build up sufficient pressure to extinguish the arc.

With the arrangement shown, any flashover from phase to phase at one tower will involve two gap devices and the attendant short-circuit power-follow-current will extinguish the arcs in the two devices involved, because they are designed to have maximum and minimum current ratings for this purpose. However, if only one tube were to flashover, the resultant arc to ground by way of the tower structure or a ground connection would involve a power-follow-current insufficient to extinguish the arc, since the only current to ground, assuming that the system is ungrounded, would be the unbalanced capacitance current to ground of the ungrounded conductors. Consequently, the gap device would be damaged, if not actually destroyed, by burning. Moreover, the gap device of itself provides no protection against ground fault disturbances.

In order to avoid this possible destruction of the gap device on the occurrence of ground fault disturbances and at the same time suppress the arc in the tube, I provide, in accordance with my invention, an inductive device connected to the system and having a zero phase sequence inductance operative on the occurrence of a ground on the phase conductor of the line to provide a lagging current for effectively suppressing the capacitance current to ground at the grounded point. Examples of such devices are well-known to the art, but the fundamental disclosure appears in United States Letters Patent 1,537,371, issued May 12, 1925, on an application filed by Waldemar Petersen. Such devices may comprise, as illustrated in Fig. 1, a reactor 21 connected in a neutral to ground connection of the system. As disclosed by Dr. Petersen, the reactance of the neutral grounding reactor is such as to provide upon grounding of a conductor of the system a lagging current of such a value as to suppress at the grounded point the unbalanced capacitance current of the ungrounded conductors of the system. In this way, the voltages which tend to build up in consequence of arc-overs on an ungrounded system, thereby causing recurrences of arcs, are prevented, all as set forth in the above-mentioned Letters Patent.

Assuming now a transient overvoltage condition involving two phase conductors such as to effect an arc discharge in each of the expulsion gaps associated with the affected phase conductors, then the power-follow-current, which is in effect a short-circuit current, will cause the extinction of the arcs in the respective gap devices. On the other hand, assuming a transient overvoltage condition on only one of the conductors of such a character as to cause an arc in the gap device associated with the conductor, then this arc-over will go to ground either directly through the ground connection or through the supporting line structure. In this case, the attendant follow-current tending to maintain the arc is only the relatively small unbalanced capacitance or charging current to ground of the two ungrounded conductors of the system. Consequently, the gap device cannot function of itself to extinguish such arc because the current tending to maintain it is below the minimum rating of the gap device. Immediately, however, upon the arc-over of the gap device, the zero phase sequence reactance device 21 passes a lagging current which is opposite in phase and of such a value as effectively to suppress the capacitance current flowing in the gap device which has arced over. Accordingly, the arc is extinguished without damage to the gap device, which is thus left in condition properly to function for arc extinction when two phase conductors are involved. Tests on an actual power system of the type in which a fault to ground on one phase conductor substantially increases the capacitance current to ground of the ungrounded phase conductors show that, with the combination of the expulsion gap 11 and the zero phase sequence reactance device 21, an arc-over to ground of an expulsion gap is extinguished in ½ cycle (60 cycle basis) or less, whereas with the reactance device alone a minimum of about 50 cycles is required to extinguish an arc-over on a line conductor. Obviously the rapid extinction of the arc in the case of the combination of the two devices insures the safety of the gap device against damage by charring, etc., on the unbalanced capacitance current whose value is below the minimum expulsion rating of the gap device. Moreover, there may occur cases in which two gap devices arc-over more or less simultaneously, thus causing the flow of phase to phase short-circuit current, but do not operate to extinguish their respective arcs at the same instant. If for any reason one gap device should thus be left with an existing arc, such arc might last long enough to damage the device, if it were not for the presence of the zero phase sequence arc suppressor 21. Thus, in arrangements embodying my invention the necessary protection towards transient overvoltages involving one or more phase conductors is obtained without the necessity of an additional expulsion gap device at each line supporting tower or structure and the consequent greatly increased costs attendant thereon, particularly in cases of long lines.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an alternating current electric line, an inductive device connected thereto and having a zero phase sequence inductance operative on the occurrence of a ground on a phase conductor of the line to provide a lagging current for effectively suppressing the capacitance current to ground at the grounded point, gap discharge means for each phase conductor having one electrode adjacent the phase conductor and another electrode spaced from said one electrode, and a common conductive connection for said other electrodes.

2. In combination, an alternating current electric line, an inductive device connected thereto and having a zero phase sequence inductance operative on the occurrence of a ground on a phase conductor of the line to provide a lagging current for effectively suppressing the capacitance current to ground at the grounded point, and gap discharge means for each phase conductor having one electrode spaced from the conductor and another electrode spaced from said one electrode and a common conductive connection for said other electrodes.

3. In combination, a polyphase alternating current overhead electric line, an inductive device in a neutral to ground connection of said line having a zero phase sequence inductance operative on the occurrence of a ground on the phase conductor of the line to provide a lagging current for effectively suppressing the capacitance current to ground at the grounded point, insulating means for supporting the phase conductors of said line at a plurality of points and gap discharge means for each phase conductor of the line at a plurality of said supporting points, having two spaced electrodes, one of said electrodes being spaced from the phase conductor and the other electrodes of the gap discharge means at each point having a common conductive connection.

4. In combination, a three-phase alternating current overhead electric line, an inductive device connected thereto and having a zero phase sequence inductance operative on the occurrence of a ground on a phase conductor of the line to provide a lagging current for effectively suppressing the capacitance current to ground at the grounded point, means for supporting the phase conductors of said line at a plurality of points, and gap discharge means for each phase conductor of the line at a plurality of said supporting points having two electrodes, one electrode of the gap discharge means at each point being adjacent the respective phase conductor at the point and the other electrodes of the gap discharge means at each point having a common conductive connection.

5. In combination, an alternating current electric line, an inductive device connected thereto and having a zero phase sequence inductance operative on the occurrence of a ground on a phase conductor of the line to provide a lagging current for effectively suppressing the capacitance current to ground at the grounded point, an expulsion gap protective device for each phase conductor at a plurality of points thereof comprising an expulsion tube and an electrode at each end thereof, one of said electrodes projecting into said tube, the devices at each of said points being mounted with the outer ends of the inwardly projecting electrodes adjacent the respective phase conductors and the other electrodes having a common connection.

6. In a polyphase circuit in which a fault to ground on one phase conductor substantially increases the capacitance current to ground of the ungrounded phase conductors, means responsive to an excessive voltage between any phase conductor and ground for establishing a relatively low impedance circuit between ground and the conductor having the excessive voltage and then interrupting said low impedance circuit if the current through said circuit exceeds a predetermined amount, and means connected to said polyphase circuit for effectively suppressing the capacitance current to ground flowing through said relatively low impedance circuit.

WALTER W. LEWIS.